(12) United States Patent
Winbow

(10) Patent No.: US 8,289,809 B2
(45) Date of Patent: Oct. 16, 2012

(54) COMMON REFLECTION AZIMUTH MIGRATION

(75) Inventor: Graham A. Winbow, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 532 days.

(21) Appl. No.: 12/538,630

(22) Filed: Aug. 10, 2009

(65) Prior Publication Data

US 2010/0061184 A1 Mar. 11, 2010

Related U.S. Application Data

(60) Provisional application No. 61/095,013, filed on Sep. 8, 2008.

(51) Int. Cl.
*G01V 1/00* (2006.01)
(52) U.S. Cl. ......................................................... 367/73
(58) Field of Classification Search .................... 367/38, 367/56, 73; 702/16
See application file for complete search history.

(56) References Cited

U.S. PATENT DOCUMENTS

| | | | | |
|---|---|---|---|---|
| 4,817,059 A * | 3/1989 | Hornby et al. | .................. | 367/28 |
| 4,839,869 A * | 6/1989 | Corcoran | ......................... | 367/53 |
| 6,178,381 B1 | 1/2001 | Padhi et al. | ....................... | 702/18 |
| 6,446,007 B1 | 9/2002 | Finn et al. | ........................... | 702/14 |
| 6,546,339 B2 | 4/2003 | Bevc et al. | ......................... | 702/18 |
| 6,778,909 B1 | 8/2004 | Popovici et al. | ................ | 702/17 |
| 7,095,678 B2 * | 8/2006 | Winbow et al. | .................. | 367/73 |

FOREIGN PATENT DOCUMENTS
WO WO 2006/014750 2/2006

OTHER PUBLICATIONS

Biondi, B. et al. (1996) "3-D Seismic Prestack Migration of Common-Azimuth Data," *Geophysics* 61.6, pp. 1822-1832.
Biondi, B. (1999) "Subsalt Imaging by Common-Azimuth Migration," *SEP (Stanford Exploration Project)* Report 100, p. 113.
Biondi, B. (2006) "Common Image Gathers," *3D Seismic Imaging*, Society of Exploration Geophysicists, Ch. 6, pp. 65-81.
Goldstein (1981) "The Eurler Angles" *Classical Mechanics*, Addison-Wesley, p. 147.
Koren, Z. et al. (2007) "Local Angle Domain in Seismic Imaging," *EAGE* 69th Conference & Exhibition—London, UK, pp. 11-14.
Mann et al. (1999) "Common-Reflection-Surface Stack—a Real Data Example," *Jrnl. Applied Geophysics*, v. 42, pp. 301-318.
Prucha, M. et al. (1999) "Angle-Domain Common Image Gathers by Wave-Equation Migration," *SEP (Stanford Exploration Project)* Report 100, pp. 101-113.

* cited by examiner

*Primary Examiner* — Isam Alsomiri
*Assistant Examiner* — Krystine Breier
(74) *Attorney, Agent, or Firm* — ExxonMobil Upstream Research Company Law Dept.

(57) ABSTRACT

Method for migration of seismic data into datasets having common azimuth angle at the reflection point. A velocity model is selected that prescribes subsurface P and/or S wave velocities including any required anisotropy parameters. (41) For shot locations on a surface grid, rays are traced on to a 3D grid of points in a target region of the subsurface. (42) At least the travel times of the rays and their dip angles at each subsurface point are stored in computer memory as they are computed. (43) Using the stored ray maps, the seismic data are migrated into seismic image volumes, each volume being characterized by at least an azimuthal angle bin, the azimuthal angles being computed from said ray dip angle information (44).

21 Claims, 3 Drawing Sheets

COMMON REFLECTION AZIMUTH MIGRATION

CROSS-REFERENCE TO RELATED APPLICATIONS

This application claims the benefit of U.S. Provisional application 61/095,013 which was filed on Sep. 8, 2008.

FIELD OF THE INVENTION

This invention relates generally to the field of geophysical prospecting, and more particularly to seismic data processing. Specifically, the invention is a method for migration of seismic data into datasets having common azimuth angle at the reflection point.

BACKGROUND OF THE INVENTION

The present invention may be regarded as an extension of U.S. Pat. No. 7,095,678 "Method for seismic imaging in geologically complex formations" to Winbow and Clee, which document is incorporated by reference into the disclosure herein.

The technical problem primarily addressed herein is the class of depth imaging situations where azimuth information at each image point is needed. Such azimuth information should take account of 3D variation of velocity and anisotropy as well as the dip of the target reflectors. Such information is useful in understanding the fracture properties of carbonate reservoirs found, for example, in the Caspian and the Middle East. Such fracture information is important to efficient hydrocarbon exploration of and production from such reservoirs because it is an important influence on the porosity and permeability of petroleum reservoirs. Present ray based imaging methods such as Kirchhoff are computationally efficient but are limited to producing seismic volumes that have constant surface (i.e. source-receiver) azimuth. This is because the maps used in the migration only contain travel times and therefore are unable to direct the output into files depending on reflection angle or reflection point azimuth. Wave equation based methods are more time consuming and expensive than ray based imaging methods. Therefore there is a need for a ray-based method that can obtain azimuthal information at the reflection points. The method should migrate 3D seismic data into common reflection point azimuth seismic volumes using ray based imaging methods, where the azimuths are defined at the image point and are valid for any dip of the target reflector. The method should be applicable for any acquisition geometry whether it is land data, bottom cable data or marine data, provided that the subsurface is not so complex that it requires wave equation methods to form adequate images.

SUMMARY OF THE INVENTION

In one embodiment, the invention is a method for migrating 3D seismic data to create depth images of reflector surfaces in a subsurface region where azimuth information at each image point is desired for petroleum exploration or production, said method comprising performing steps (a)-(c) one data trace at a time:

(a) for each combination of the trace's corresponding seismic source and receiver locations and an image point, using a ray-based imaging method to determine direction angles at the image point of a first seismic ray connecting the source to the image point and of a second seismic ray connecting the receiver location to the image point;

(b) geometrically determining mathematical relationships from which azimuthal angle at the image point of a plane defined by each first and second seismic ray pair can be solved knowing the ray direction angles; and (c) migrating the seismic data trace into data volumes labeled by a common azimuthal angle of the rays at each image point.

BRIEF DESCRIPTION OF THE DRAWINGS

The present invention and its advantages will be better understood by referring to the following detailed description and the attached drawings in which.

The invention will be described in connection with example embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 4:
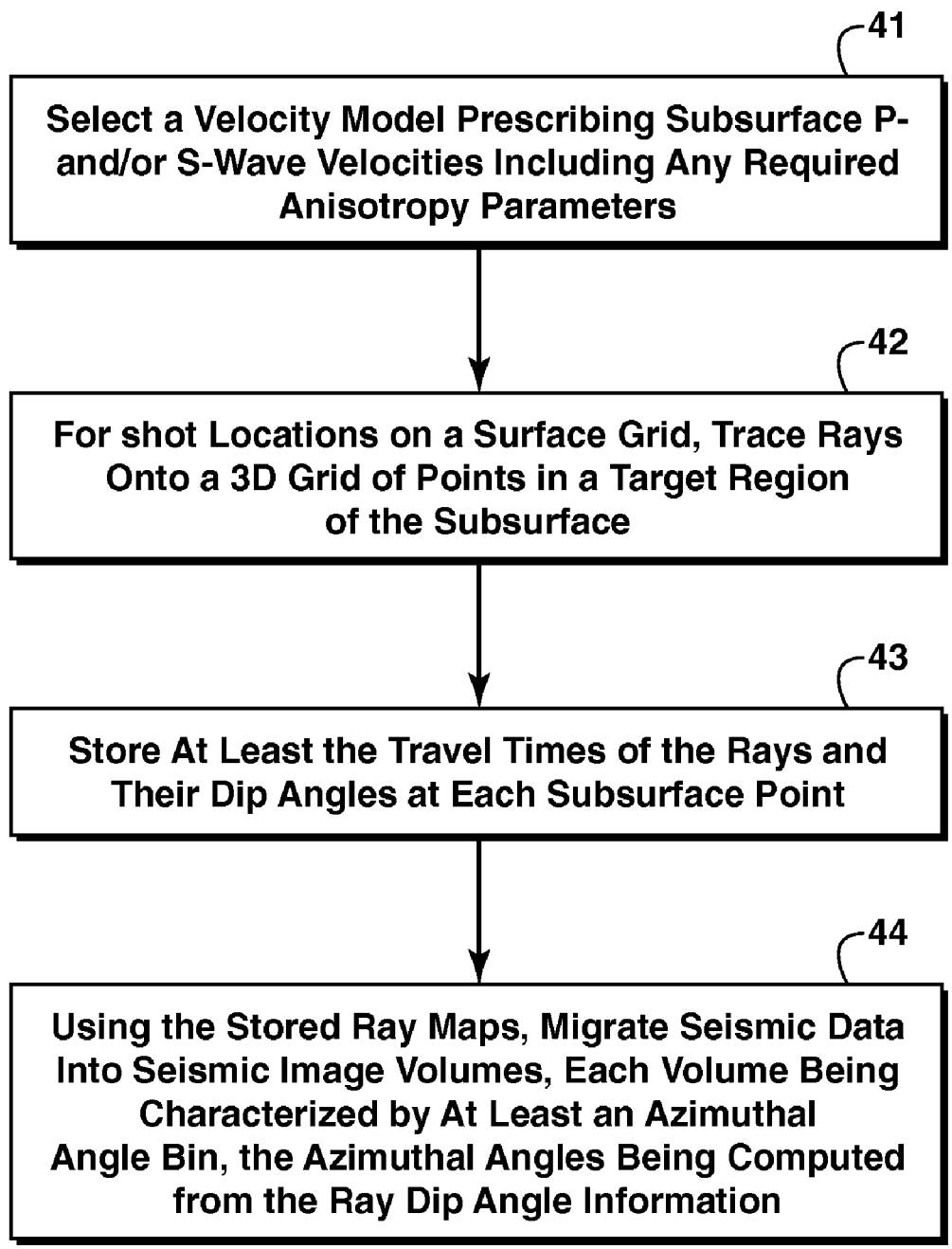
FIG. 4 is a flow chart showing steps in one embodiment of the present inventive method.

The Common Reflection Angle Migration ("CRAM") approach to imaging disclosed in U.S. Pat. No. 7,095,678 is particularly well suited to the class of imaging problems described above (in the "Background" section). This is because a key feature of CRAM is that, given a velocity model (step 41 in the flow chart of FIG. 4) and a sufficiently detailed ray tracer such as the commercially available software code NORSAR-3D, the travel time, amplitude, surface dip and image point dip are known for all rays in the one-way ray maps. This applies whether the imaging is P-P, P-S, or S-S, and whatever anisotropy is or is not included. For the present purpose, a key point is that the dip directions of the one-way rays at each reflector point are stored in the mapping phase and are available to the migration kernel. The CRAM patent (U.S. Pat. No. 7,095,678) is incorporated by reference herein in its entirety.

Figure 1:
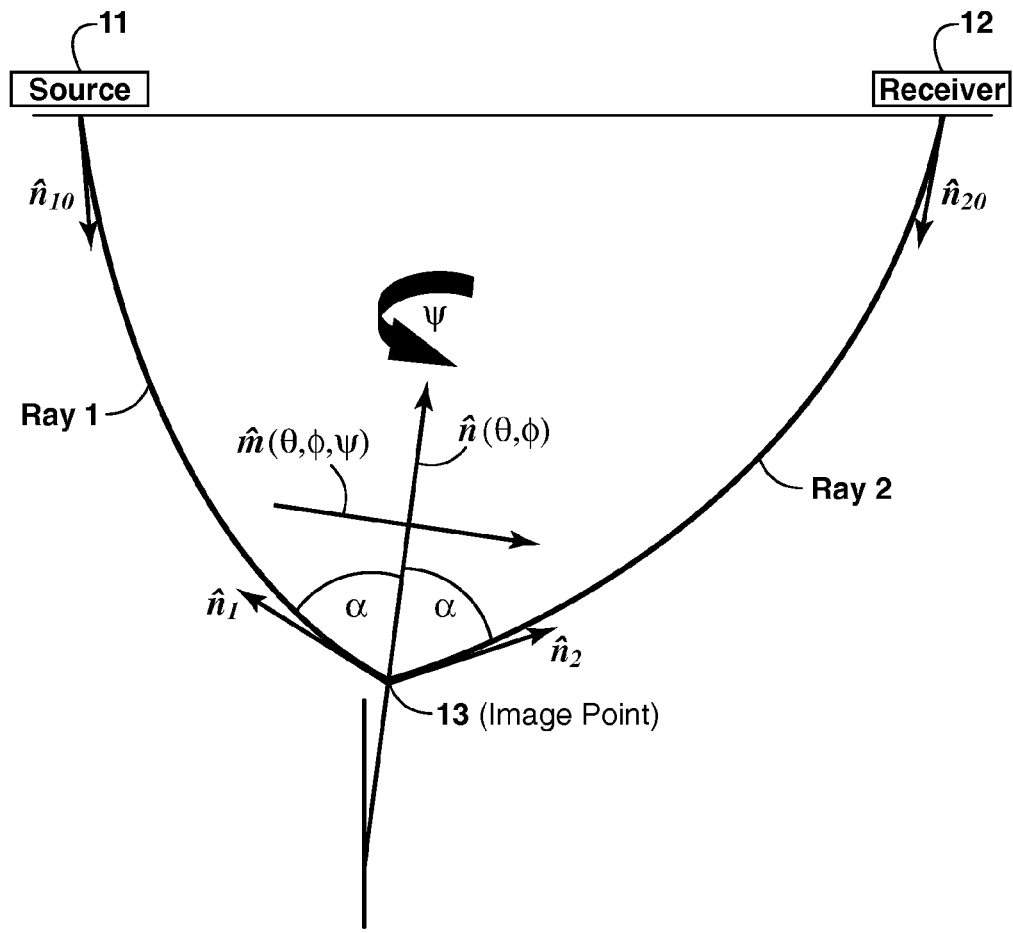
FIG. 1 is a diagram showing the geometry for P-P common reflection angle migration.

FIG. 1 illustrates the geometry for P-P CRAM. (PP means that the incident seismic wave is a P-wave, and it reflects as a P-wave.) Ray 1 connects the seismic source 11 to the image (i.e., reflection) point 13, while Ray 2 connects the receiver location 12 to the image point. In preferred embodiments of the invention, these rays are traced by ray tracer software for seismic shot locations on a surface grid on to a 3D grid of points in a target region of the subsurface (Step 42 in FIG. 4). What follows, through equation 16 is a description of how the azimuthal angles are computed from ray dip angles, i.e. from angles made by one-way rays at the reflection point with respect to the normal to the reflector surface at that point (see step 44 of FIG. 4). Note that the terms "image point" and "reflection point" are used somewhat interchangeably herein, with the understanding that there is a difference in precise meaning: an image point may or may not turn out to be a reflection point, according to whether the migration process finds or does not find a reflector at an image point.

As described by U.S. Pat. No. 7,095,678, ray direction unit vectors $\hat{n}_{10}$, $\hat{n}_{20}$ give the directions of each ray at the surface while ray direction unit vectors $\hat{n}_1$, $\hat{n}_2$ give the ray directions at the image point. Herein, all symbols that have a caret (^) appearing over them refer to unit vectors. The unit dip vector $\hat{n}$ bisects the angle between $\hat{n}_1$ and $\hat{n}_2$, and its components may be referred to as the dip, or dip direction, corresponding to the ray pair and image point 13. The colatitude angle $\theta$ and longitude angle $\phi$ specify the Cartesian components of $\hat{n}$ in the standard way:

$$\hat{n}_x = \sin\theta\cos\phi$$

$$\hat{n}_y = \sin\theta\sin\phi$$

$$\hat{n}_z = \cos\theta \qquad (1)$$

The angle $\alpha$ is the reflection angle and the angle $\psi$ is the azimuth angle. As stated in U.S. Pat. No. 7,095,678: "The angle $\psi$ around the rotation axis defined by $\hat{n}$ determines the orientation of the plane defined by the rays at the image point. In forming the seismic image the angle $\psi$ is usually summed over, which can be accomplished by ignoring it in the kernel. However, if $\psi$ is computed in the kernel, it is also possible to produce seismic volumes that depend on both $\psi$ and the reflection angle $\alpha$." The present invention is a method for doing this.

The angle $\alpha$ can be computed from the equation:

$$\cos(2\alpha) = \hat{n}_1 \cdot \hat{n}_2 \qquad (2)$$

Vectors $\hat{n}$ and $\hat{m}$ can be found from:

$$\hat{n} = (\hat{n}_1 + \hat{n}_2)/(2\cos\alpha) \qquad (3)$$

$$\hat{m} = (\hat{n}_2 - \hat{n}_1)/(2\sin\alpha) \qquad (4)$$

Figure 2:
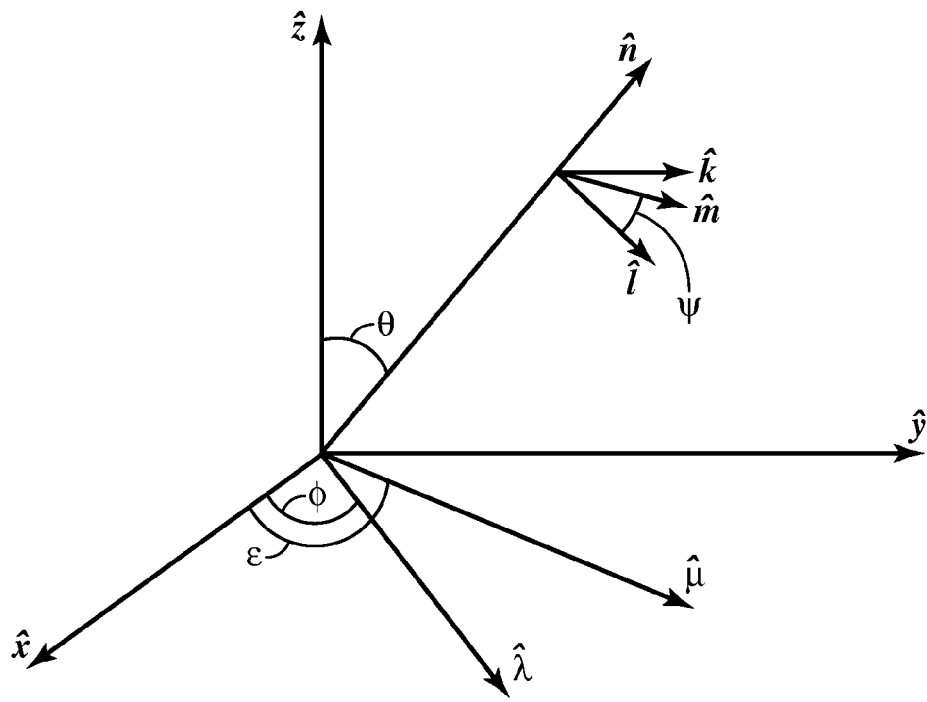
FIG. 2 is a diagram defining angles used in the present inventive method.

Vectors $\hat{n}$ and $\hat{m}$ are therefore mutually perpendicular and are coplanar with $\hat{n}_1$ and $\hat{n}_2$. The vector $\hat{m}$ is related to angle $\psi$ as explained below. FIG. 2 contains the information needed to express the azimuth angles in terms of the vectors $\hat{m}$ and $\hat{n}$. The orientation of the reflection plane defined by $\hat{m}$ and $\hat{n}$ or equivalently $\hat{n}_1$ and $\hat{n}_2$ is defined by the composite of three rotations:

$$R(\psi,\theta,\phi) = R_z(\psi) R_y(\theta) R_z(\phi) \qquad (5)$$

The initial configuration has vectors $\hat{n}_1$ and $\hat{n}_2$ in the x-z plane each making an angle $\alpha$ with the z-axis along which $\hat{n}$ is pointed. The succession of rotations of the coordinate axes in equation (5) corresponds to the "y-convention" described at greater length by Goldstein (*Classical Mechanics*, Addison-Wesley, 147 (1981)). That is, the rotations are, in order, around the z-axis by an angle $\phi$, followed by rotation around the new y-axis by an angle $\theta$, followed by rotation around the new z-axis by an angle $\psi$. The vector $\hat{n}$ points along the final z-axis while the vectors $\hat{l}$ an $\hat{k}$ point along the x and y-axes after the second rotation $R_y(\theta)$. The vectors $\hat{z}$, $\hat{n}$ and $\hat{l}$ lie in a plane that intersects the x-y plane in a line defined by the unit vector $\hat{\lambda}$. The vectors $\hat{n}$ and $\hat{m}$ define a plane that meets the x-y plane in a line defined by the vector $\hat{\mu}$. The vector $\hat{\mu}$ defines the azimuthal direction of the reflecting rays relative to a fixed direction in space, taken here as the x-axis. The angle $\epsilon$ is defined by:

$$\cos\epsilon = \hat{x} \cdot \hat{\mu} \qquad (6)$$

This angle coincides with the angle $\phi$ defined by Biondi (Biondo Biondi, 3*D Seismic Imaging*, Society of Exploration Geophysicists, Ch. 6 (2006)). The angle $\psi$ is the azimuthal angle relative to the dip direction of the imaged reflector.

The unit vectors $\hat{l}$ and $\hat{k}$ are related to angles $\theta$ and $\phi$:

$$\hat{l} = (\cos\theta\cos\phi, \cos\theta\sin\phi, -\sin\theta) \qquad (7)$$

and, $$\hat{k} = (-\sin\phi, \cos\phi, 0) \qquad (8)$$

One way to compute the angle $\psi$ is from the simultaneous equations:

$$\begin{pmatrix} \cos\psi \\ \sin\psi \\ 0 \end{pmatrix} = \begin{bmatrix} \hat{l} \\ \hat{k} \\ \hat{n} \end{bmatrix} \hat{m} \qquad (9)$$

The azimuthal angle $\epsilon$ can be computed from the ray directions as:

$$\tan\epsilon = \frac{n_{2y}/n_{2z} - n_{1y}/n_{1z}}{n_{2x}/n_{2z} - n_{1x}/n_{1z}} \qquad (10)$$

Equation (10) is equivalent to a formula of Biondi and Palacharla (*Geophysics* 61, 1822-1832 (1996)) and Biondi (3*D Seismic Imaging*, Ch 6, Society of Exploration Geophysicists (2006)). However, these references present it in a wave equation imaging context instead of the ray based imaging context of the present invention. The methods described in the 2006 Biondi reference are focused on downward continuation imaging methods, which are much more time consuming and expensive than the ray based imaging methods used in the present invention. Chapter 6 gives various formulas and comments based on wave equation imaging without disclosing how to process seismic data to produce common azimuthal angle sections. Other examples of a common azimuth downward continuation method include U.S. Pat. No. 6,778,909 to Popovici et al.; and Prucha et al., SEP (Stanford Exploration Project) Report 100, pp 101-113 (1999). Only reflection angles are considered. Azimuth angles are treated only with the assumption that azimuth is constant in depth, which is not generally true in depth imaging.

The angle $\psi$ can be most efficiently computed as:

$$\tan\psi = \frac{\tan(\epsilon - \phi)}{\cos\theta} \qquad (11)$$

where $\theta$ and $\phi$ can be calculated from equations (1).

For interpretation of the fracture angles in seismic data both angles $\epsilon$ and $\psi$ may be required, depending on the complexity of the fracture system under investigation. This is because the angle $\epsilon$ refers to the azimuthal angle relative to a fixed direction in space, in this case relative to the x-axis. The angle $\psi$ refers to the azimuth relative to the direction of dip of the reflector. Both fracture patterns are found in fractured rocks in real world geology.

Figure 3:
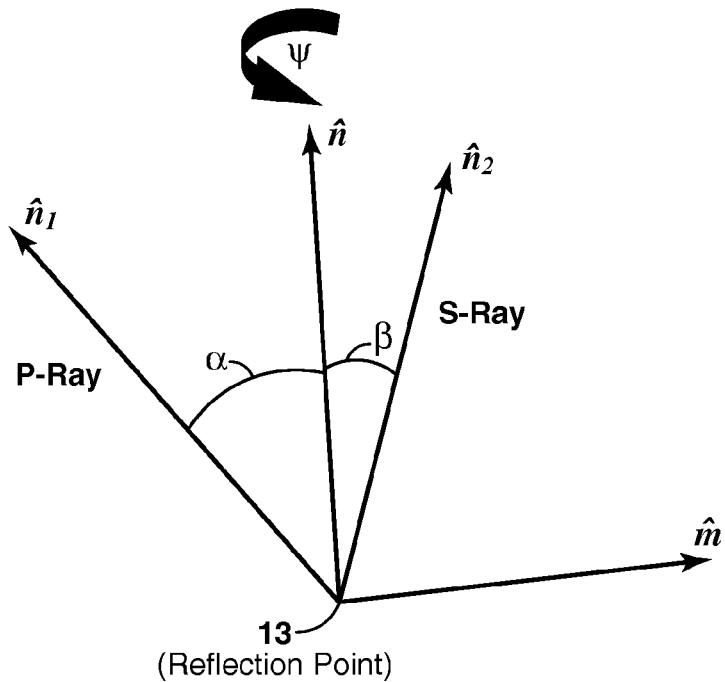
FIG. 3 is a diagram showing the geometry for P-S imaging.

These formulas apply to the case of P-P reflection imaging. For the case of P-S imaging which is also important for investigating fractures (since S-waves are more sensitive to fractures than P-waves), all of the above formulas apply except for the definitions of vectors $\hat{m}$ and $\hat{n}$ which have to be redefined in terms of $\hat{n}_1$ and $\hat{n}_2$ as shown in FIG. 3. In this case the incidence angle of the P-wave relative the reflector normal $\hat{n}$ is $\alpha$, and the angle of the departing S-wave relative to the reflector normal is $\beta$. For P-S imaging the vectors $\hat{m}$ and $\hat{n}$ can be computed as follows.

First the total reflection angle $\alpha+\beta$ is calculated by:

$$\cos(\alpha+\beta)=\hat{n}_1 \cdot \hat{n}_2 \qquad (12)$$

Then the individual angles $\alpha$ and $\beta$ are computed from:

$$\sin\alpha = \frac{\sin(\alpha+\beta)}{[\{v_S/v_P + \cos(\alpha+\beta)\}^2 + \sin^2(\alpha+\beta)]^{1/2}} \qquad (13)$$

$$\sin\beta = (v_S/v_P)\sin\alpha \qquad (14)$$

where $v_S$ and $v_P$ are respectively the S- and P-wave velocities at the image point.

With this information the reflector normal can be constructed as:

$$\hat{n} = \frac{\hat{n}_1 \sin\beta + \hat{n}_2 \sin\alpha}{\sin(\alpha+\beta)} \qquad (15)$$

The unit vector $\hat{m}$ that describes (through its rotation around the normal $\hat{n}$) the azimuth angle $\psi$ at the reflection point is in the plane of the reflector and is:

$$\hat{m} = \frac{\hat{n}_1 \cos\beta - \hat{n}_2 \cos\alpha}{\sin(\alpha+\beta)} \qquad (16)$$

The angle $\epsilon$ can be computed from equation 10. The angle $\psi$ can be computed from equations 1 and 11. Alternatively, equations 1, 10, and 11 can be used.

As explained in the previous section, the best way to implement migration into common azimuth datasets is to first compute one-way ray maps that contain at a minimum (see step 43 in FIG. 4):

(1) travel times
(2) dip values at the target locations

Normally, (as explained in U.S. Pat. No. 7,095,678) the ray maps used in CRAM would also contain amplitudes, KMAH indices and dip vectors at the source locations. As explained in the previous section the angles $\alpha$, $\psi$, and $\epsilon$ can be computed from $\hat{n}_1$ and $\hat{n}_2$. This applies for both P-P and P-S imaging. The unusual case of S-P imaging is the same as P-S imaging with source and receiver exchanged, while the case of S-S imaging is similar to the case of P-P imaging with S-wave velocities substituted for P-wave velocities. Thus far herein, only isotropic media have been explicitly considered; however anisotropic media can be dealt with in the same way.

Koren et al. describe a local angle domain ("LAD") for use in seismic imaging. (Paper 297, EAGE 69$^{th}$ Conference & Exhibition, London, Jun. 11-14, 2007) Their LAD is a system of four angles defining the interaction between incident and reflected waves at a specific image point. Two angles represent the spatial direction of the ray-path normal: its dip and azimuth. The third angle is the half-opening angle between the incident and reflected rays. The fourth angle is the azimuth of the ray-pair plane measured in the ray-pair reflection surface. In U.S. Patent Application Publication No. 2008/0109168 (May 8, 2008), Koren and Ravve use the LAD angles in angle-domain imaging of seismic data. They map the seismic data set to a second data set of lower dimensionality, and then image the second set of data. This approach is computer intensive, and may be impractical for 3D seismic data sets. In contrast, the present inventive method reads in a data trace, computes the reflection and azimuth angles on the fly using stored dip information as explained in detail in the CRAM patent (U.S. Pat. No. 7,095,678), and migrates that trace before the next data trace is read into the computer. This results in an advantageous savings of computer time and resources.

The method for performing migration in the present invention is preferably but not necessarily CRAM. For example, the seismic data may be migrated into common offset data volumes, common shot volumes, or common receiver volumes. (Step 44 in FIG. 4) The scope of the present invention includes all such migration methods.

It will be understood by those skilled in the art that the methods described herein enable migration into volumes that are labeled by azimuth and/or reflection angle in any way convenient for the end user. This is because determining the angles $\alpha$, $\psi$ and/or $\epsilon$ on the fly in the migration kernel makes it possible to "scatter" the migration output into volumes appropriately labeled by $\alpha$, $\psi$ and/or $\epsilon$.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A computer-implemented method for migrating 3D seismic data to create depth images of reflector surfaces in a subsurface region where azimuth information at each image point is desired for petroleum exploration or production, said method comprising performing steps (a)-(c) one data trace at a time:

(a) for each combination of the trace's corresponding seismic source and receiver locations and an image point, using a ray-based imaging method to determine direction angles at the image point of a first seismic ray connecting the source to the image point and of a second seismic ray connecting the receiver location to the image point;

(b) geometrically determining mathematical relationships from which an azimuthal angle at the image point of a plane defined by each first and second seismic ray pair can be solved knowing the ray direction angles;

(c) migrating the seismic data trace into data volumes labeled by a common azimuthal angle of the rays at each image point, wherein said common azimuthal angle is the azimuthal angle from (b) defined relative to a selected zero direction; wherein (a), or (c), or both are performed using a computer; and (d) outputting the migrated image as represented by data volumes of common azimuthal angle at each image point.

2. The method of claim 1, wherein the mathematical relationships also allow solving for a reflection angle, this being the angle between said first and second rays, and wherein the seismic data trace is migrated into data volumes labeled by common reflection angle as well as azimuthal angle of the rays at each image point.

3. The method of claim 2, wherein the method is computer implemented and the migrating uses stored dip information to determine the reflection angle and azimuthal angle from the mathematical relationships, for each trace separately during imaging.

4. The method of claim 1, further comprising:

(e) using the azimuthal angles at reflection points to interpret the subsurface region's petroleum potential.

5. The method of claim 4, wherein the azimuthal angles are used to understand fracture or anisotropy properties of the subsurface formation.

6. The method of claim 1, wherein the mathematical relationships provide a solution for the azimuthal angle either relative to a global system of coordinates or relative to the ray pair's dip direction at the image point.

7. The method of claim 1, further comprising computing ray maps containing at least travel times and dip values at image points.

8. The method of claim 7, wherein the method is computer implemented and the direction angles of the first and second rays at each image point are stored in the ray maps, available to a migration kernel performing step (c).

9. The method of claim 1, wherein the azimuthal angle $\epsilon$ relative to the x-axis of a fixed (x,y,z) coordinate system is calculated from an equation that may be expressed as $$\tan\varepsilon = \frac{n_{2y}/n_{2z} - n_{1y}/n_{1z}}{n_{2x}/n_{2z} - n_{1x}/n_{1z}}$$

where the terms on the right hand side are Cartesian components of unit vectors $\hat{n}_1, \hat{n}_2$ which respectively give directions of the first and second seismic rays.

10. The method of claim 9, wherein the azimuthal angle $\psi$ relative to the ray pair's dip direction at the image point is calculated from an equation that may be expressed as $$\tan\psi = \frac{\tan(\varepsilon - \phi)}{\cos\theta}$$

wherein $\theta$ and $\phi$ are calculated from $\hat{n}_x = \sin\theta \cos\phi$ $\hat{n}_y = \sin\theta \sin\phi$ $\hat{n}_z = \cos\theta$ where $\hat{n}$ is unit dip vector for the ray pair at the image point.

11. The method of claim 10, wherein the seismic data being imaged is P-P or S-S data, and $\hat{n}$ is calculated from $\hat{n} = (\hat{n}_1 + \hat{n}_2)/(2\cos\alpha)$ where $\alpha$ is the reflection angle calculated from $\cos(2\alpha) = \hat{n}_1 \cdot \hat{n}_2$.

12. The method of claim 10, wherein the seismic data being imaged is P-S or S-P data, and $\hat{n}$ is calculated from $$\hat{n} = \frac{\hat{n}_1 \sin\beta + \hat{n}_2 \sin\alpha}{\sin(\alpha + \beta)}$$

where $\beta+\beta$ is calculated from $\cos(\alpha+\beta) = \hat{n}_1 \cdot \hat{n}_2$ and individual angles $\alpha$ and $\beta$ are computed from:

$$\sin\alpha = \frac{\sin(\alpha + \beta)}{[\{v_S/v_P + \cos(\alpha+\beta)\}^2 + \sin^2(\alpha+\beta)]^{1/2}}$$

$\sin\beta = (v_S/v_P)\sin\alpha$ where $v_S$ and $v_P$ are respectively S-wave and P-wave velocity in the subsurface region at the image point.

13. The method of claim 1, wherein the seismic data being imaged is P-P or S-S data and wherein the azimuthal angle $\psi$ relative to the ray pair's dip direction at the image point is calculated by solving simultaneous equations that may be expressed as $$\begin{pmatrix} \cos\psi \\ \sin\psi \\ 0 \end{pmatrix} = \begin{bmatrix} \hat{l} \\ \hat{k} \\ \hat{n} \end{bmatrix} \hat{m}$$

where $\hat{n} = (\hat{n}_1 + \hat{n}_2)/(2\cos\alpha)$ $\hat{m} = (\hat{n}_2 - \hat{n}_1)/(2\sin\alpha)$ and reflection angle $\alpha$ is computed from $\cos(2\alpha) = \hat{n}_1 \cdot \hat{n}_2$ where unit vectors $\hat{n}_1, \hat{n}_2$ respectively give directions of the first and second seismic rays, and unit vectors $\hat{l}$ and $\hat{k}$ are related to angles $\theta$ and $\phi$:

$\hat{l} = (\cos\theta \cos\phi, \cos\theta \sin\phi, -\sin\theta)$ and, $\hat{k} = (-\sin\phi, \cos\phi, 0)$ where $\theta$ and $\phi$ are related to a fixed (x,y,z) coordinate system by $\hat{n}_x = \sin\theta \cos\phi$ $\hat{n}_y = \sin\theta \sin\phi$ $\hat{n}_z = \cos\theta$.

14. The method of claim 1, wherein the seismic data being imaged is P-S or S-P data and wherein the azimuthal angle v relative to the ray pair's dip direction at the image point is calculated by solving simultaneous equations that may be expressed as $$\begin{pmatrix} \cos\psi \\ \sin\psi \\ 0 \end{pmatrix} = \begin{bmatrix} \hat{l} \\ \hat{k} \\ \hat{n} \end{bmatrix} \hat{m}$$

where $\hat{n}$ is unit dip vector for the ray pair at the image point and is calculated from $$\hat{n} = \frac{\hat{n}_1 \sin\beta + \hat{n}_2 \sin\alpha}{\sin(\alpha + \beta)}$$

where $\alpha+\beta$ is calculated from $\cos(\alpha+\beta) = \hat{n}_1 \cdot \hat{n}_2$ and individual angles α and β are computed from:

$$\sin\alpha = \frac{\sin(\alpha+\beta)}{[\{v_S/v_P + \cos(\alpha+\beta)\}^2 + \sin^2(\alpha+\beta)]}$$

$$\sin\beta = (v_S/v_P)\sin\alpha$$

where $v_s$ and $v_p$ are respectively shear wave and P-wave velocity in the subsurface region at the reflection point, and unit vector $\hat{m}$ is perpendicular to $\hat{n}$ and is given by $$\hat{m} = \frac{\hat{n}_1 \cos\beta - \hat{n}_2 \cos\alpha}{\sin(\alpha+\beta)}$$

and unit vectors $\hat{l}$ and $\hat{k}$ are related to angles θ and φ:

$\hat{l} = (\cos\theta\cos\phi, \cos\theta\sin\phi, -\sin\theta)$ and, $\hat{k} = (-\sin\phi, \cos\phi, 0)$ where θ and φ are related to a fixed, global (x,y,z) coordinate system by $\hat{n}_x = \sin\theta\cos\phi$ $\hat{n}_y = \sin\theta\sin\phi$ $\hat{n}_z = \cos\theta$.

15. The method of claim 1, further comprising geometrically determining mathematical relationships from which a reflection angle of each ray can be solved knowing the ray direction angles; and migrating the seismic data into data volumes labeled by reflection angle as well as azimuthal angle.

16. The method of claim 15, wherein the seismic data are migrated using Common Reflection Angle Migration ("CRAM").

17. The method of claim 16, wherein migrating the seismic data into data volumes specified by azimuthal angle and reflection angle comprises the computer implemented steps:

(i) discretizing all or part of the subsurface region containing a target formation into a three-dimensional grid of image cells, each such image cell containing a plurality of points of a pre-selected three-dimensional image point grid, cell dimensions being chosen to balance data storage requirements with imaging accuracy;

(ii) discretizing into a grid of cells the surface above the target formation, the dimensions of such surface cells being chosen relative to seismic shot point and receiver spacings so as to balance data storage requirements with imaging accuracy;

(iii) computing ray map files from known or assumed velocity distribution information, said files representing all physically significant ray paths connecting a representative point in a surface cell to a representative point in an image cell, using a velocity distribution for the subsurface region to determine the ray paths, said ray map files containing at least the surface cell to image cell travel time, the takeoff direction at each surface cell and the arrival direction at each image cell, said directions being specified in three-dimensional space;

(iv) repeating step (iii) for each surface cell and each image cell;

(v) storing the ray map files in computer memory;

(vi) interpolating travel times from the ray map files, said interpolated times being times from the particular shot point and receiver locations associated with one seismic data trace down to each point on the image point grid for each said physically significant ray path connecting same, said interpolation comprising:

interpolating a surface cell representative point near each said particular shot point location and each said particular receiver point location;

and interpolating an image cell representative point near said each point on the image grid;

wherein said interpolations are implemented using the ray direction information in the corresponding ray map file in order to ensure that interpolation is made between points on the same branch of a travel time surface;

(vii) repeating step (vi) for each trace in the seismic data volume; and (viii) migrating the seismic data using the interpolated travel times and the ray amplitudes.

18. The method of claim 1, wherein the seismic data are migrated into data volumes labeled by common azimuthal angle, or by common azimuthal angle and common reflection angle, and by one other label chosen from a list consisting of common offset, common shot, and common receiver.

19. The method of claim 1, further comprising selecting a velocity model for the subsurface region, said velocity model providing P-wave or S-wave or both velocities as a function of subsurface location, said model being with or without anisotropy parameters, wherein the velocity model is used for ray tracing in the ray-based imaging method in step (a).

20. The method of claim 1, wherein the mathematical relationships determined in (b) yield an azimuthal angle that is measured relative to the ray pair's dip direction at the image point, thereby resulting after imaging in (c) in azimuthal angles at points on the reflector surfaces that are measured relative to the dip direction of the reflector surface at any such point.

21. A method for producing hydrocarbons from a subsurface region, comprising:

(a) obtaining data from a 3D seismic survey of the subsurface region;

(b) obtaining a processed version of the data wherein the data were imaged using a method as described in claim 1, which is incorporated herein by reference, thus producing data volumes labeled by azimuth and reflection angle;

(c) obtaining an interpretation of the imaged data wherein the interpretation used the azimuth data to interpret structure in the subsurface region; and (d) drilling a well into the subsurface region and producing hydrocarbons based at least partly on the interpreted structure of the subsurface region.

* * * * *